US009032534B2

(12) United States Patent (10) Patent No.: US 9,032,534 B2
Koga (45) Date of Patent: May 12, 2015

(54) SETTING IN WIRELESS COMMUNICATION DEVICE FOR ENCRYPTED COMMUNICATION

(75) Inventor: Katsuyuki Koga, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1614 days.

(21) Appl. No.: 11/017,207

(22) Filed: Dec. 21, 2004

(65) Prior Publication Data

US 2005/0154874 A1    Jul. 14, 2005

(30) Foreign Application Priority Data

Dec. 26, 2003  (JP) ................................. 2003-431924

(51) Int. Cl.
*G06F 7/04* (2006.01)
*H04B 1/00* (2006.01)
(52) U.S. Cl.
CPC ........................................ *H04B 1/00* (2013.01)
(58) Field of Classification Search
CPC .............. G06F 21/10; G11B 20/00086; G11B 20/0021; H04L 63/0428
USPC ................... 713/150–154, 16, 171, 182–184; 726/26–30; 380/270; 709/220–222, 709/227–229
See application file for complete search history.

(56) References Cited

U.S. PATENT DOCUMENTS

| 5,282,247 A * | 1/1994 | McLean et al. ................ 711/164 |
| 7,031,735 B2 * | 4/2006 | Koshino ......................... 455/500 |
| 7,174,157 B2 * | 2/2007 | Gassho et al. ................. 455/410 |
| 7,221,961 B1 * | 5/2007 | Fukumoto et al. ............. 455/557 |
| 7,321,784 B2 * | 1/2008 | Serceki et al. ................. 455/557 |
| 2002/0178365 A1 * | 11/2002 | Yamaguchi ..................... 713/182 |
| 2003/0194090 A1 * | 10/2003 | Tachikawa ...................... 380/270 |
| 2004/0054863 A1 * | 3/2004 | Harada et al. .................. 711/164 |
| 2004/0102218 A1 * | 5/2004 | Nago ............................. 455/558 |

(Continued)

FOREIGN PATENT DOCUMENTS

| JP | 63-107667 A | 5/1988 |
| JP | 9-016732 A | 1/1997 |

(Continued)

OTHER PUBLICATIONS

Neeli R. Prasad, "IEEE 802.11 System Design", 2000, IEEE, pp. 490-494.*

(Continued)

*Primary Examiner* — Luu Pham
*Assistant Examiner* — Canh Le
(74) *Attorney, Agent, or Firm* — Sughrue Mion, PLLC (57) ABSTRACT

A system administrator of a wireless LAN 100 manipulates a personal computer PC1 to change a WEP key. The personal computer PC1 authenticates a memory card MC as genuine under management of the system administrator. In the case of the authenticated memory card MC, changed setting information, as well as a previous WEP key before the change of the setting information, is written into the memory card MC. The system administrator then inserts this memory card MC into a memory card slot of a printer PRT1. The printer PRT1 authenticates the memory card MC as genuine under management of the system administrator. In the case of the authenticated memory card MC, the setting information is updated. This arrangement effectively relieves the user's workload in setting wireless communication devices, while ensuring the sufficiently high security.

12 Claims, 5 Drawing Sheets

(56) References Cited

U.S. PATENT DOCUMENTS

| | | | |
|---|---|---|---|
| 2004/0146032 A1* | 7/2004 | Lin | 370/338 |
| 2004/0214524 A1* | 10/2004 | Noda et al. | 455/41.2 |
| 2004/0235522 A1* | 11/2004 | Lin | 455/558 |
| 2005/0015467 A1* | 1/2005 | Noda | 709/220 |

FOREIGN PATENT DOCUMENTS

| | | |
|---|---|---|
| JP | 2003-223307 | 8/2003 |
| JP | 2003-229872 A | 8/2003 |
| JP | 2003-304258 A | 10/2003 |
| JP | 2003-338821 A | 11/2003 |

OTHER PUBLICATIONS

Robert J. Boncella, Wireless Security: An Overview, Communication of the Association for Information Systems, vol. 9, Oct. 10-27, 2002, pp. 269-282.*

* cited by examiner

SETTING IN WIRELESS COMMUNICATION DEVICE FOR ENCRYPTED COMMUNICATION

BACKGROUND OF THE INVENTION

1. Field of the Invention

The present invention relates to setting in a wireless communication device for encrypted communication.

2. Description of the Related Art

A wireless LAN (local area network) has widely been used to connect multiple devices including computers, printers, and projectors by wireless communication. Wireless communication devices using radio waves for wireless communication are generally used in the wireless LAN. Encrypted communication is typically adopted in the wireless LAN to prevent leakage of data to the third person. The wireless LAN requires settings of various parameters for network connection to establish wireless communication between the wireless communication devices. The wireless LAN also requires settings of key information for encryption and decryption in the respective wireless communication devices to establish encrypted communication. Hereafter the settings of the various parameters and the settings of the key information are collectively referred to as setting information.

In the case of connection of a new wireless communication device to an existing wireless LAN, the new wireless communication device is required to input the setting information of the existing wireless LAN. In the case of a change in setting information for the security purpose, all the wireless communication devices connected to the wireless LAN are required to update the setting information. In a general procedure, the user individually inputs and updates the setting information in these wireless communication devices. Such input and update are rather time and labor consuming. Especially in a wireless LAN including a large number of wireless communication devices, the user has extremely heavy workload.

Various techniques have been proposed to relieve the user's workload. For example, the technique disclosed in Japanese Patent Laid-Open Gazette No. 2003-338821 sends setting information from one wireless communication device with the setting information to another wireless communication device without the setting information by default setting wireless communication and enables another wireless communication device to set the received setting information.

This proposed technique establishes default setting wireless communication to send the setting information by non-encrypted communication. This method has the relatively poor security level since there is a possibility that the transmission contents are leaked to the third person.

SUMMARY OF THE INVENTION

The object of the invention is thus to eliminate the drawbacks of the prior art techniques and to relieve the user's workload in setting wireless communication devices, while ensuring the sufficiently high security.

In order to attain at least part of the above and the other related objects, the present invention is directed to a first wireless communication device for encrypted communication. The first wireless communication device includes: a setting information storage module that stores setting information used for the encrypted communication; an interface that is used to write the setting information into a portable recording medium; a judgment information input module that externally inputs judgment information, which is used to determine whether output of the setting information to the interface is to be permitted or prohibited; a determination module that determines whether the output of the setting information to the interface is to be permitted or prohibited, based on the input judgment information; and an output control module that controls the output of the setting information to the interface, according to a result of the determination.

The 'setting information' is, for example, an ESS-ID, a WEP key, a communication mode, or a communication channel in wireless communication in conformity with International Standard IEEE 802.11. The 'portable recording medium' is, for example, a memory card, a flexible disk, or an IC card. The terminology 'externally input' means that the user may manipulate an input device like a keyboard for entry of the judgment information or that the judgment information may be input from a recording medium, such as a magnetic card or a memory card.

In the first wireless communication device of the invention, the setting information is written into the portable recording medium when the determination module gives permission to output the setting information to the interface. Namely the setting information is not written into the portable recording medium when the determination modules does not give permission to output the setting information or prohibits the setting information from being output. This arrangement ensures the sufficiently high security level as long as the user adequately manages the judgment information and the recording medium with the setting information written therein.

The user connects the portable recording medium with the setting information written therein to an interface of another wireless communication device that is used to read data from the portable recording medium. Another wireless communication device then automatically sets the setting information read from the portable recording medium via the interface.

The setting information stored in the wireless communication device of the invention is thus readily set in another wireless communication device. This arrangement of the invention effectively relieves the user's workload in setting the wireless communication devices, while ensuring high security.

The technique of the invention is also applicable to wireless communication devices using radio waves in conformity with other standards like Bluetooth (registered trademark) and HomeRF (registered trademark), as well as to wireless communication devices using infrared rays or other light rays.

In one preferable embodiment of the first wireless communication device of the invention, the determination module determines whether the output of the setting information to the interface is to be permitted or prohibited, based on the judgment information and the setting information.

In one applicable procedure, the determination module compares the judgment information with information included in the setting information and determines whether the output of the setting information to the interface is to be permitted or prohibited, according to a result of the comparison as matching or mismatching. In another applicable procedure, the determination module makes a predetermined operation of the judgment information and information included in the setting information and determines whether the output of the setting information to the interface is to be permitted or prohibited, according to a result of the operation.

In another preferable embodiment of the first wireless communication device of the invention, the judgment information input module inputs the judgment information from the portable recording medium.

The setting information is written into the portable recording medium, in which the judgment information for permission to output the setting information is recorded. The user can manage both the setting information and the judgment information by using only one recording medium.

In the first wireless communication device of this preferable embodiment, the setting information storage module and the portable recording medium respectively store passwords, and the determination module gives permission to output the setting information to the interface when the two passwords are identical.

In this application of the present invention, the password stored in the portable recording medium is used as the judgment information. The setting information storage module may store the password as part of the setting information or may alternatively store the password as inapplicable information to wireless communication, independently of the setting information.

This arrangement readily determines whether the output of the setting information to the interface is to be permitted or prohibited, based on matching or mismatching of the two passwords.

The first wireless communication device of the above application may conform to International Standard IEEE 802.11, and the password is, for example, a WEP key.

The wireless communication device conforming to the International Standard IEEE 802.11 uses the WEP key for encrypted communication. A typical procedure changes the WEP key with every change in setting information. This arrangement of the invention changes the password with a change in setting information, thus ensuring high security.

The setting information storage module may store both the changed WEP key that is used for wireless encrypted communication and a previous WEP key before the change that is not used for wireless encrypted communication. In the process of reading the WEP key as the password from the recording medium after the change of the setting information and writing the changed setting information into the recording medium, the previous WEP key before the change is used as the password of the wireless communication device.

In the first wireless communication device of the above embodiment where the judgment information input module inputs the judgment information from the portable recording medium, it is preferable that the determination module, in the case of failed input of the judgment information, waits for a change of the setting information from factory default setting information and gives permission to output the changed setting information to the interface.

The terminology 'in the case of failed input of the judgment information' represents, for example, an initial state in which no data is recorded in the portable recording medium or a state in which only data irrelevant to the setting information is recorded in the portable recording medium.

In principle, when the user has already set the setting information in the wireless communication device, the procedure of this arrangement prohibits the setting information from being written into the portable recording medium in the initial state or in the state with only the data irrelevant to the setting information. As long as the setting information represents factory default setting, however, the procedure receives the user's entry of new setting information and gives a permission to write the new setting information into the portable recording medium that is either in the initial state or in the state with only the data irrelevant to the setting information and is connected to the interface for data writing. This arrangement effectively prevents illegal leakage of the setting information from the wireless communication device.

Another application of the invention is a wireless communication device that inputs the setting information output from the first wireless communication device of the invention via the portable recording medium and establishes encrypted communication with the first wireless communication device.

The invention is accordingly directed to a second wireless communication device for encrypted communication. The second wireless communication device includes: a setting information storage module that stores first setting information used for the encrypted communication; an interface that is used to read data from a portable recording medium; a setting information input module that inputs second setting information from the portable recording medium, in which the second setting information is recorded, via the interface; a determination module that determines whether update of the first setting information to the second setting information is to be permitted or prohibited, based on the first setting information and the second setting information; and an update control module that controls the update of the first setting information to the second setting information, according to a result of the determination.

When the portable recording medium is authenticated as genuine under management of the user, the second setting information recorded in the portable recording medium is identical with the setting information written by the first wireless communication device of the invention.

Simple connection of the portable recording medium to the interface enables the second wireless communication device to determine whether update of the setting information is to be permitted or prohibited and to automatically update the first setting information stored in the setting information storage module to the second setting information. This arrangement desirably relives the user's workload.

In one preferable embodiment of the second wireless communication device of the invention, the determination module gives permission to update the first setting information to the second setting information, only when the first setting information represents factory default setting information.

The procedure of this embodiment prohibits update of the setting information when the first setting information stored in the setting information storage module is different from the factory default setting information, that is, when the user has already set the setting information in the wireless communication device. This arrangement effectively prevents illegal update of the setting information in the wireless communication device.

In another preferable embodiment of the second wireless communication device of the invention, the setting information storage module and the portable recording medium respectively store passwords, and the determination module gives permission to update the first setting information to the second setting information when the two passwords are identical.

When the two passwords are mismatched, the portable recording medium is determined as unauthorized. This arrangement effectively prevents illegal update of the setting information from any unauthorized recording medium.

The second wireless communication device of this embodiment may conform to International Standard IEEE 802.11, and the password is, for example, a WEP key.

The previous WEP key before the change of the setting information set in another wireless communication device is recorded as the password in the portable recording medium, independently of the WEP key included in the second setting information. The second wireless communication device has used the previous WEP key before the change to establish encrypted communication with another wireless communication device. This previous WEP key before the change should thus be identical with the WEP key included in the first setting information stored in the second wireless communication device. This arrangement readily determines update of the first setting information to the second setting information is to be permitted or prohibited by simple comparison between the two WEP keys.

The wireless communication device of the invention may not have all the characteristics discussed above but may omit some of these characteristics or may have adequate combination of these characteristics. The present invention is not restricted to the wireless communication devices having any of the above arrangements, but is actualized by diversity of other applications, for example, control methods of controlling such wireless communication devices, computer programs that are used to attain such control methods, and recording media in which such computer programs are recorded.

In the applications of the invention as the computer programs and the recording media in which the computer programs are recorded, the invention may be given as whole programs to control the operations of the wireless communication devices or as partial programs to exert only the characteristic functions of the invention. Available examples of the recording media include flexible disks, CD-ROMs, DVD-ROMs, magneto-optical disks, IC cards, ROM cartridges, internal storage devices (memories like RAMs and ROMs) and external storage devices of the computer.

These and other objects, features, aspects, and advantages of the present invention will become more apparent from the following detailed description of the preferred embodiment with the accompanied drawings.

DESCRIPTION OF THE PREFERRED EMBODIMENTS

Figure 1:
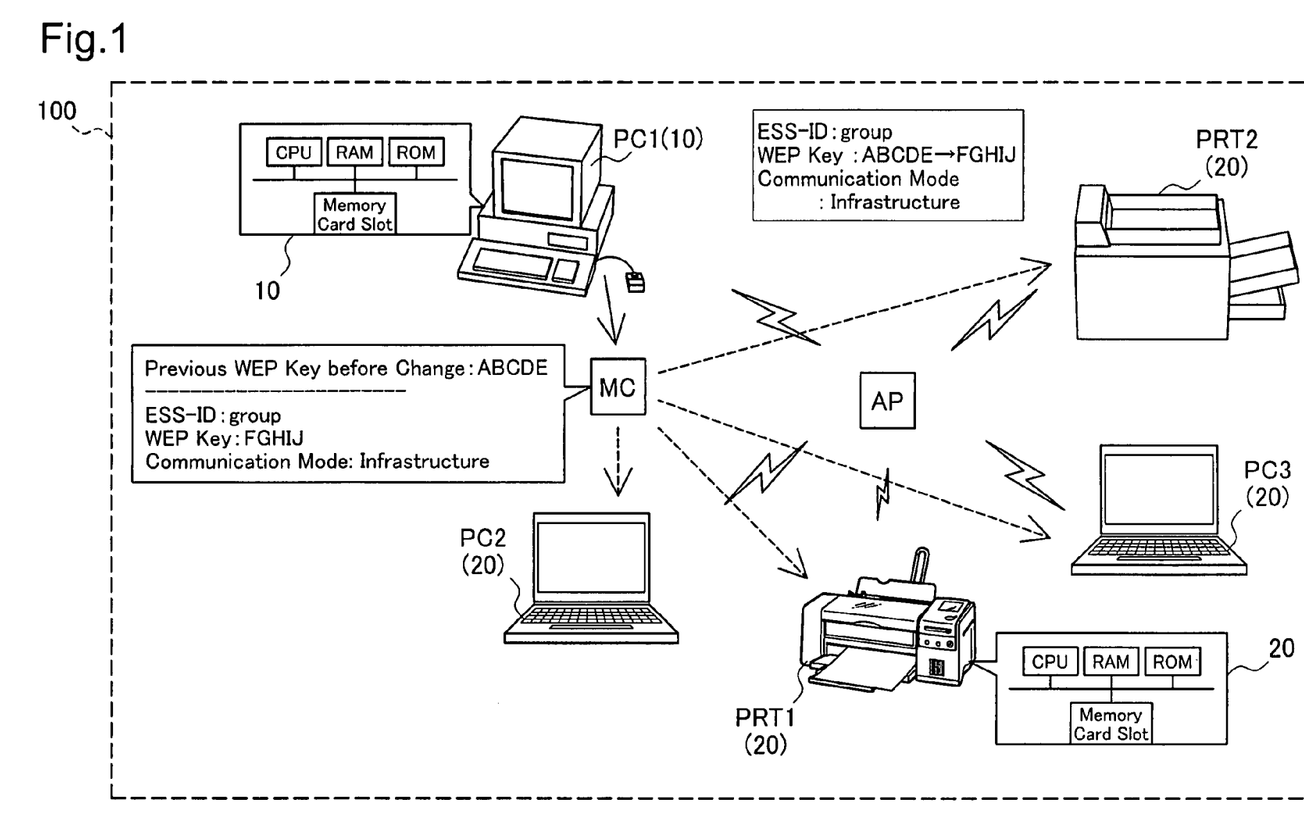
FIG. 1 shows the construction of a wireless LAN 100 with wireless communication devices in one embodiment of the invention.

One mode of carrying out the invention is discussed below as a preferred embodiment in the following sequence:
A. Construction of Wireless LAN
B. Wireless Communication Device (Setting Output Side)
C. Wireless Communication Device (Setting Input Side)
D. Setting Output Process
E. Setting Update Process
F. Modifications
A. Construction of Wireless LAN FIG. 1 shows the construction of a wireless LAN 100 with wireless communication devices in one embodiment of the invention. The wireless LAN 100 of this embodiment is in conformity with the International Standard IEEE 802.11. This wireless LAN 100 includes three personal computers PC1, PC2, and PC3, two printers PRT1 and PRT2, and an access point AP.

Each of the personal computers PC1, PC2, and PC3 includes a CPU, a RAM, a ROM, a memory card slot, and a non-illustrated wireless LAN card and functions as a wireless communication device. Software programs are installed in each of the personal computers PC1, PC2, and PC3 to establish wireless encrypted communication and to change setting information of the wireless LAN.

Each of the printers PRT1 and PRT2 is connected to a wireless print server as a wireless communication device. The wireless print server includes a CPU, a RAM, a ROM, and a memory card slot. Software programs are stored in the ROM of each wireless print server to establish wireless encrypted communication and to change setting information of the wireless LAN.

The wireless LAN 100 of this embodiment adopts an infrastructure mode to establish wireless communication between the wireless communication devices via the access point AP. The setting information of the wireless LAN set in each of the personal computers PC1, PC2, and PC3 and the wireless print servers connected to the printers PRT1 and PRT2 includes various parameters, such as an ESS-ID as identification information for grouping the network, a WEP key as key information to establish encrypted communication, and a communication mode. In the wireless LAN, wireless encrypted communication is allowed only between the wireless communication devices with common setting information. In the following description of this embodiment, it is assumed that 'group' and 'ABCDE' are set respectively to the ESS-ID and the WEP key of the wireless LAN 100.

In this embodiment, the system administrator of the wireless LAN 100 changes the setting information at regular intervals to prevent data leakage from the wireless LAN 100. More specifically the WEP key is changed for this purpose in this embodiment. The system administrator of the wireless LAN 100 first operates the personal computer PC1 to load the software program for changing the setting information and change the WEP key from 'ABCDE' to 'FGHIJ'. The personal computer PC1 then authenticates the memory card MC as genuine under management of the system administrator. When the memory card MC is authenticated, the personal computer PC1 writes the changed setting information into the memory card MC. The previous WEP key before the change, as well as the changed setting information is written into the memory card MC. The system administrator inserts the memory card MC into the memory card slot of another wireless communication device. Another wireless communication device authenticates the memory card MC as genuine under management of the system administrator. When the memory card MC is authenticated, another wireless communication device updates the setting information. The detailed processing executed by each wireless communication device to change or update the setting information will be discussed later.

The personal computer PC1 is a wireless communication device that outputs the setting information and writes the setting information into the memory card MC, and corresponds to the first wireless communication device of the invention. Hereafter the personal computer PC1 is called the wireless communication device 10. Each of the other personal computers PC2 and PC3 and the wireless print servers connected to the printers PRT1 and PRT2 is a wireless communication device that reads the setting information from the memory card MC and updates the setting information, and corresponds to the second wireless communication device of the invention. Hereafter the personal computers PC2 and PC3 and the wireless print servers connected to the printers PRT1 and PRT2 are collectively called the wireless communication device 20.

B. Wireless Communication Device (Setting Output Side)

Figure 2:
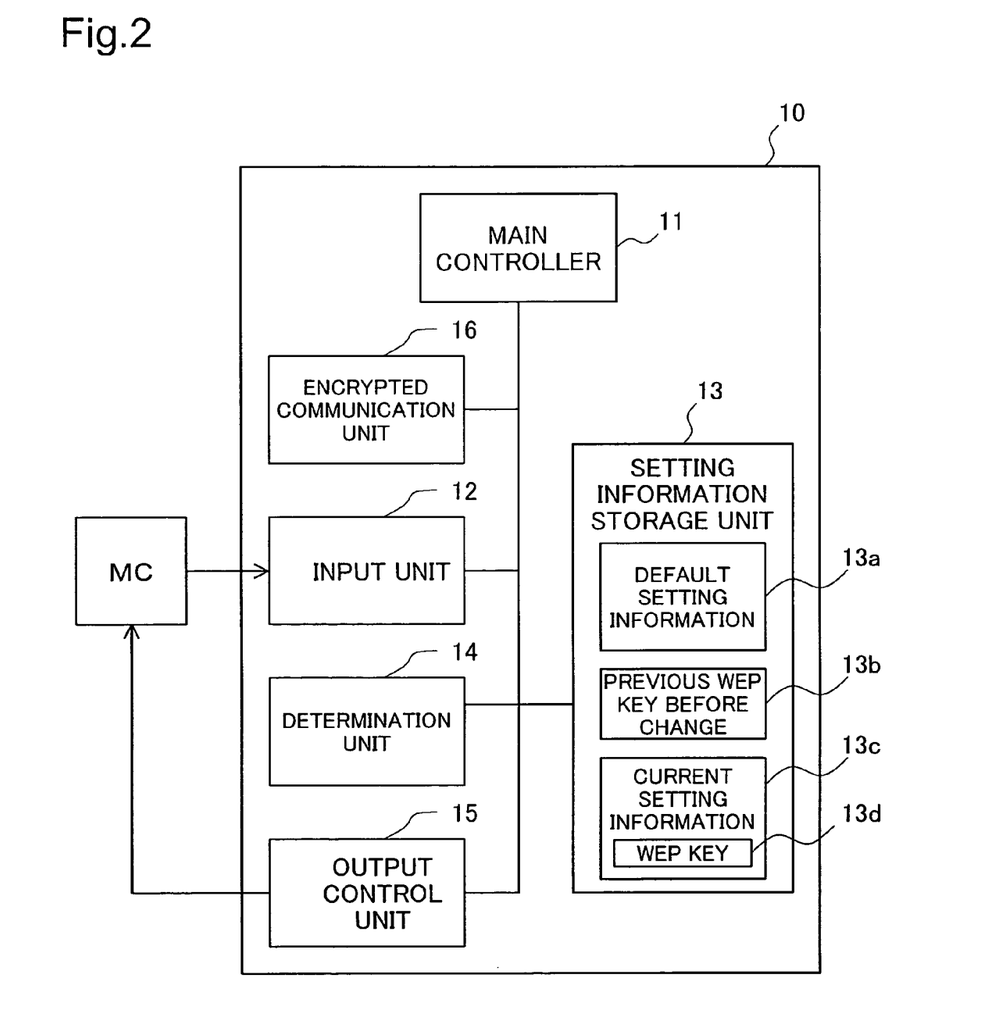
FIG. 2 schematically illustrates the structure of one wireless communication device 10.

FIG. 2 schematically illustrates the structure of the wireless communication device 10 that writes the setting information into the memory card MC. The wireless communication device 10 includes functional blocks, which are synchronized and cooperate under control of a main controller 11. These functional blocks are actualized by the software configuration in this embodiment, although may alternatively be attained by the hardware configuration.

An input unit 12 inputs the WEP key, 'ABCDE' in the illustrated example of FIG. 1, from the memory card MC used for recording and management of the setting information via the memory card slot. This WEP key is equivalent to the password and the judgment information in the first wireless communication device of the invention.

A setting information storage unit 13 stores the setting information used for encrypted communication with the wireless communication device 20 via the wireless LAN 100. In this embodiment, the setting information storage unit 13 stores default setting information 13a as factory default setting information, current setting information 13c as changed setting information, and a previous WEP key 13b ('ABCDE' in the illustrated example of FIG. 1) before the change to a current WEP key 13d ('FGHIJ' in the illustrated example of FIG. 1) included in the current setting information 13c. The default setting information 13a includes, for example, settings of 'ESS-ID: None', 'WEP Key: None', and 'Communication Mode: Ad Hoc Mode).

A determination unit 14 compares the WEP key read from the memory card MC with the previous WEP key 13b before the change of the setting information and gives a permission to write the current setting information 13c into the memory card MC when the two WEP keys are identical. The identical WEP keys prove that the memory card MC is authenticated as genuine for recording and management of the setting information. The determination unit 14 determines the memory card MC as unauthorized and prohibits the current setting information 13c from being written into the memory card MC, on the other hand, when the WEP key is not successfully read from the memory card MC or when the WEP key read from the memory card MC is mismatched with the previous WEP key 13b before the change. This prevents illegal leakage of the setting information.

An output control unit 15 writes the current setting information 13c, as well as the previous WEP key 13b before the change into the memory card MC via the memory card slot, when the determination unit 14 gives a writing permission. The reason of writing the previous WEP key 13b before the change will be described later.

An encrypted communication unit 16 uses the current setting information 13c stored in the setting information storage unit 13 to implement encryption and decryption, while establishing wireless communication with the wireless communication device 20.

C. Wireless Communication Device (Setting Input Side)

Figure 3:
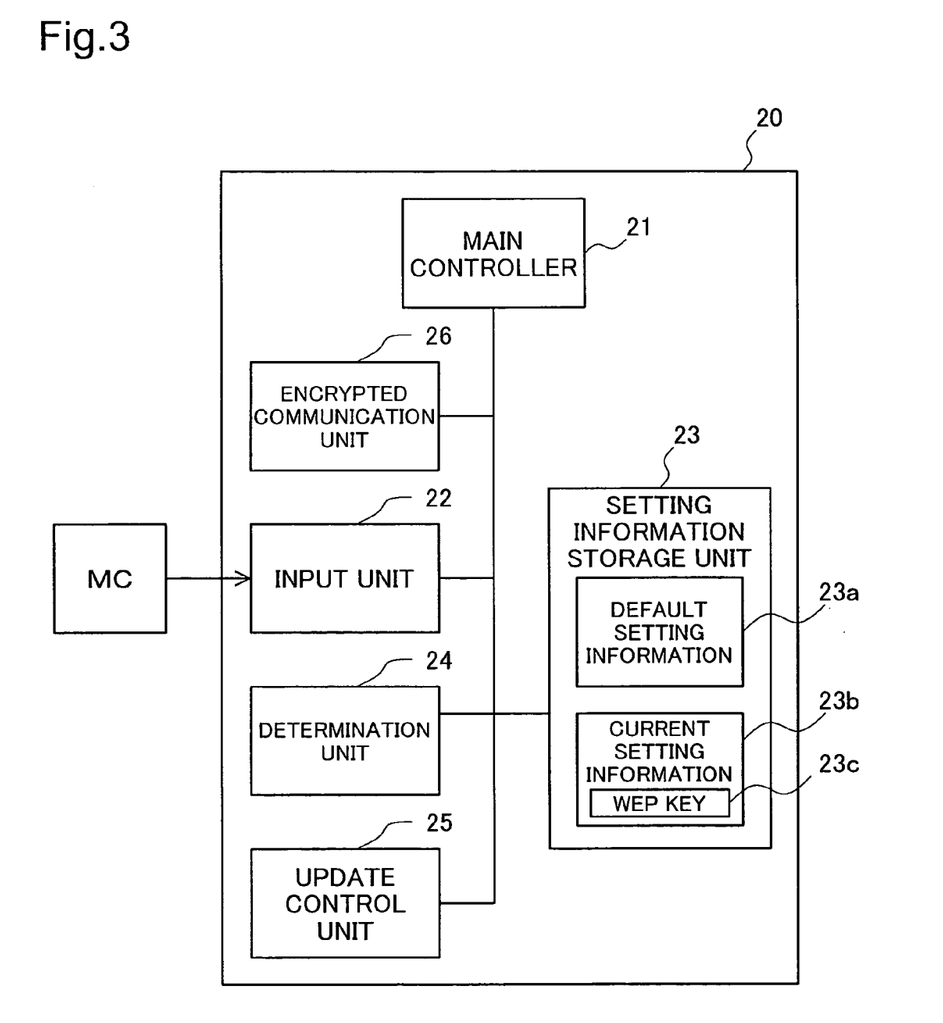
FIG. 3 schematically illustrates the structure of another wireless communication device 20.

FIG. 3 schematically illustrates the structure of the wireless communication device 20 that reads the setting information from the memory card MC. The wireless communication device 20 includes functional blocks, which are synchronized and cooperate under control of a main controller 21. These functional blocks are actualized by the software configuration in this embodiment, although may alternatively be attained by the hardware configuration.

An input unit 22 inputs the previous WEP key 13b before the change and the current setting information 13c, that is, the setting information updated by the wireless communication device 10, from the memory card MC via the memory card slot. The previous WEP key 13b before the change read from the memory card MC is equivalent to the password in the second wireless communication device of the invention.

A setting information storage unit 23 stores the setting information used for encrypted communication with the wireless communication device 10 via the wireless LAN 100. In this embodiment, the setting information storage unit 23 stores default setting information 23a as factory default setting information and current setting information 23c, which includes a WEP key 23c. The current setting information 23b is identical with the previous setting information before the change in the wireless communication device 10. In the illustrated example of FIG. 1, the WEP key 23b is 'ABCDE'.

A determination unit 24 compares the previous WEP key 13b before the change read from the memory card MC with the current WEP key 23c and gives a permission to update the current setting information 23b to the setting information 13c read from the memory card MC. The identical WEP keys prove that the memory card MC is authenticated as genuine for recording and management of the setting information. The determination unit 24 determines the memory card MC as unauthorized and prohibits the current setting information 23c stored in the setting information storage unit 23 from being updated, on the other hand, when the previous WEP key 13b is not successfully read from the memory card MC or when the previous WEP key 13b read from the memory card MC is mismatched with the current WEP key 23b. This prevents illegal update of the setting information.

An update control unit 25 updates the current setting information 23b to the setting information 13c read from the memory card MC, when the determination unit 24 gives a permission to update the setting information.

An encrypted communication unit 26 uses the updated current setting information 23c stored in the setting information storage unit 23, to implement encryption and decryption, while establishing wireless communication with the wireless communication device 10.

D. Setting Output Process

Figure 4:
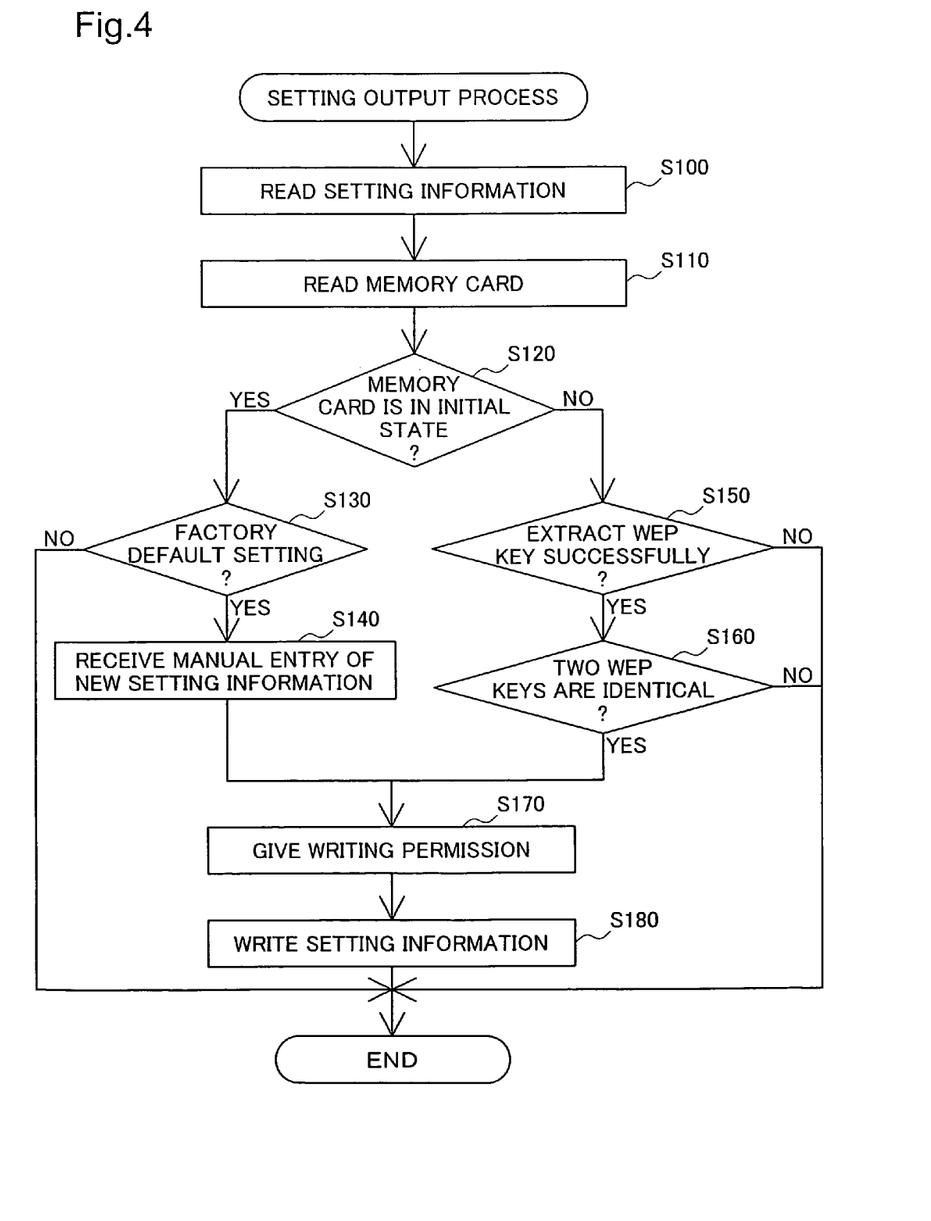
FIG. 4 is a flowchart showing a setting output process executed by the wireless communication device 10.

FIG. 4 is a flowchart showing a setting output process executed by the wireless communication device 10. The CPU of the wireless communication device 10 executes the setting output process, in response to insertion of the memory card MC into the memory card slot of the wireless communication device 10 after the system administrator manually changes the setting information in the wireless communication device 10.

The CPU first reads the setting information 13c from the setting information storage unit 13 (step S100) and reads the recorded data from the memory card MC (step S110). The CPU then determines whether the memory card MC inserted in the memory card slot is in the initial state (step S120). The initial state of the memory card MC is detectable, for example, by measuring the total memory capacity and the available memory of the memory card MC.

When the memory card MC inserted in the memory card slot is in the initial state (step S120: Yes), the CPU subsequently determines whether the setting information 13c read at step S100 represents the factory default setting (step S130). When the setting information 13c represents the factory default setting (step S130: Yes), the CPU receives the system administrator's manual entry of new setting information (step S140) and gives a permission to write the new setting information 13c into the memory card MC (step S170). The new setting information 13c is then written into the memory card MC (step S180). When the setting information 13c does not represent the factory default setting (step S130: No), on the other hand, the CPU immediately exits from this setting output routine without writing the setting information 13c into the memory card MC.

In principle, the procedure of this embodiment prohibits the setting information 13c, which has been entered by the system administrator, from being written into the memory card MC in the initial state. As long as the setting information 13c represents the factory default setting, however, the procedure receives the system administrator's manual entry of new setting information and gives a permission to write the new setting information 13c into the memory card MC in the initial state via the memory card slot.

When the memory card MC inserted in the memory card slot is not in the initial state (step S120: No), the CPU subsequently determines whether the WEP key is successfully read from the memory card MC (step S110). In the failed extraction of the WEP key (step S150: No), the CPU determines the memory card MC as unauthorized for recording and management of the setting information 13c and immediately exits from this setting output routine.

In the successful extraction of the WEP key (step S150: Yes), on the other hand, the CPU compares the WEP key 13d read from the setting information storage unit 13 with the WEP key read from the memory card MC (step S160). When the two WEP keys are identical (step S160: Yes), the CPU gives a permission to write the setting information 13c into the memory card MC (step S170). The setting information, as well as the previous WEP key 13b before the change, is written into the memory card MC (step S180).

When the two WEP keys are mismatched (step S160: No), on the other hand, the CPU determines the memory card MC set in the memory card slot as unauthorized and immediately exits from this setting output routine without writing the setting information 13c into the memory card MC.

This setting output process of the embodiment effectively prevents illegal leakage of the setting information from the wireless communication device 10.

E. Setting Update Process

Figure 5:
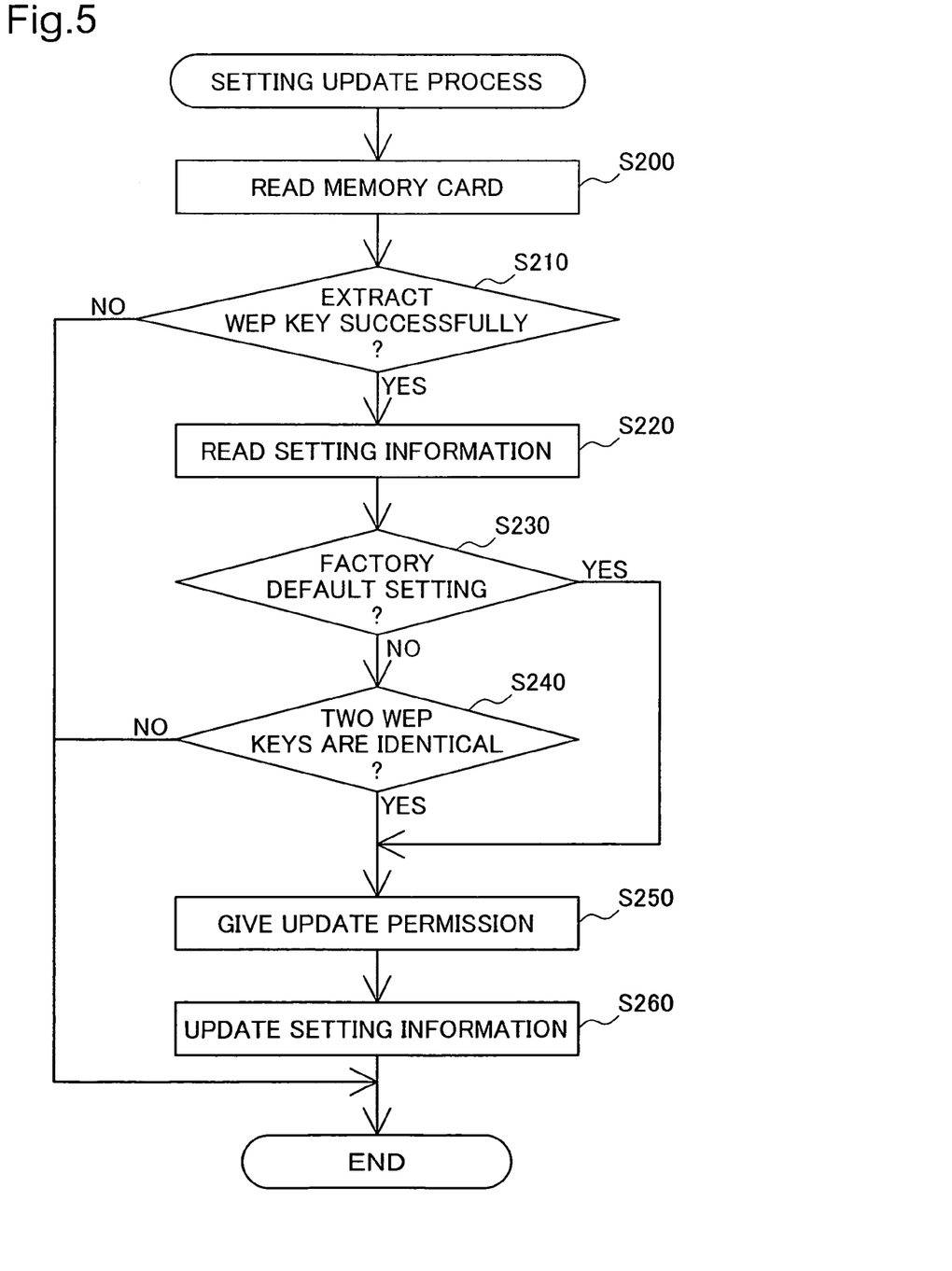
FIG. 5 is a flowchart showing a setting update process executed by the wireless communication device 20.

FIG. 5 is a flowchart showing a setting update process executed by the wireless communication device 20. The CPU of the wireless communication device 20 executes the setting update process, in response to insertion of the memory card MC into the memory card slot of the wireless communication device 20.

The CPU first reads the recorded data from the memory card MC (step S200) and determines whether the WEP key 13b is successfully read from the memory card MC (step S210). In the failed extraction of the WEP key 13b (step S210: No), the CPU determines the memory card MC set in the memory card slot as unauthorized and immediately exits from this setting update routine.

In the successful extraction of the WEP key 13b (step S210: Yes), on the other hand, the CPU reads the setting information 23b from the setting information storage unit 23 (step S220) and determines whether the read-out setting information 23b represents the factory default setting (step S230). When the setting information 23b represents the factory default setting (step S230: Yes), the CPU gives a permission to update the setting information 23b (step S250). The setting information 23b is then updated to the setting information 13c read from the memory card MC (step S260).

When the setting information 23b read from the setting information storage unit 23 does not represent the factory default setting (step S230: No), on the other hand, the CPU compares the previous WEP key 13b before the change read from the memory card MC with the WEP key 23c read from the setting information storage unit 23 (step S240). When the two WEP keys are identical (step S240: Yes), the CPU gives a permission to update the setting information 23b (step S250). The setting information 23b is then updated to the setting information 13c read from the memory card MC (step S260).

When the two WEP keys are mismatched (step S240: No), on the other hand, the CPU determines the memory card MC set in the memory card slot as unauthorized and immediately exits from this setting update routine without updating the setting information 23b. This setting update process of the embodiment effectively prevents illegal update of the setting information 23b in the wireless communication device 20.

As described above, the wireless communication device 10 of the embodiment adequately manages the memory card MC with the setting information 13c and the previous WEP key 13b before the change written therein to ensure the high security. The wireless communication device 20 of the embodiment automatically determines whether the memory card MC is authorized or unauthorized by simple insertion of the memory card MC into the memory card slot and updates the setting information 23b only in the case of the authorized memory card MC. This desirably relieves the system administrator's workload.

F. Modifications

The embodiment discussed above is to be considered in all aspects as illustrative and not restrictive. There may be many modifications, changes, and alterations without departing from the scope or spirit of the main characteristics of the present invention. Some examples of possible modification are given below.

F1. Modified Example 1

In the embodiment discussed above, the WEP key is input as the password from the memory card MC. The system administrator may manipulate an input device like a keyboard to enter the password. The structure of the embodiment effectively uses only one memory card MC for both management of the setting information 13c and management of the password.

F2. Modified Example 2

The procedure of the above embodiment uses the WEP key as the password to determine whether the wireless communication device 10 is permitted to write or prohibited from writing the setting information 13c into the memory card MC and to determine whether the wireless communication device 20 is permitted to update or prohibited from updating the setting information 23b. Another piece of information may alternatively be used as the password for the same purpose. The procedure of the embodiment automatically changes the password (WEP key) with a change in setting information 13c, thus ensuring the high security.

F3. Modified Example 3

The above embodiment regards the wireless LAN 100 in conformity with the International Standard IEEE 802.11. This is, however, not essential. The technique of the invention is also applicable to wireless communication devices using radio waves in conformity with other standards like Bluetooth (registered trademark) and HomeRF (registered trademark), as well as to wireless communication devices using infrared rays or other light rays.

F4. Modified Example 4

In the structure of the embodiment discussed above, the memory card MC is used to store and update the setting information. The memory card MC may be replaced by any other portable recording medium, for example, a flexible disk or an IC card or by an exclusive recording medium allowed to update the setting information in the wireless LAN 100.

F5. Modified Example 5

In the structure of the embodiment discussed above, the wireless communication device 10 is different from the wireless communication device 20. This is, however, not essential. The wireless communication device 10 may have all or part of the functions of the wireless communication device 20, while the wireless communication device 20 may have all or part of the functions of the wireless communication device 10. In this modified arrangement, any one among all the wireless communication devices connecting with the wireless LAN 100 changes the setting information, and the change in setting information is reflected on all the remaining wireless communication devices. This modified arrangement enhances the convenience.

F6. Modified Example 6

The procedure of the above embodiment determines whether the memory card MC is in the initial state at step S120 in the setting output process shown in the flowchart of FIG. 4. This processing flow is, however, not restrictive. One modified processing flow may replace the processing of step S120 with the processing of step S150 to determine whether the WEP key is successfully extracted. In the case of failed extraction of the WEP key, the processing flow goes to step S130. In the case of successful extraction of the WEP key, the processing flow goes to step S160. Even when data irrelevant to the setting information is recorded in the memory card MC, on condition that the setting information 13c represents the factory default setting, this modified processing flow allows the system administrator to manually enter new setting information and writes the new setting information 13c into the memory card MC. This arrangement also effectively prevents illegal leakage of the setting information 13c from the wireless communication device 10.

The present application claims the priority, based on Japanese Patent Application No. 2003-431924 filed on Dec. 26, 2003, which is herein incorporated by reference.

All changes within the meaning and range of equivalency of the claims are intended to be embraced therein. The scope and spirit of the present invention are indicated by the appended claims, rather than by the foregoing description.

What is claimed is:

1. A wireless communication device for encrypted communication, the wireless communication device comprising:
   an information storage module configured to store:
      setting information determined and to be used for the encrypted communication; and
      judgment information stored on the wireless communication device, the judgment information stored on the wireless communication device being at least part of setting information previously used for the encrypted communication;
   an interface configured to write:
      the setting information determined and to be used for the encrypted communication into a portable recording medium; and
      at least part of setting information previously used for the encrypted communication as judgment information stored on the portable recording medium;
   a judgment information input module configured to input the judgment information stored on the portable recording medium from the portable recording medium, the judgment information stored on the portable recording medium being used to determine whether output of the setting information to the interface is to be permitted or prohibited;
   a determination module configured to determine whether the output of the setting information to the interface is to be permitted or prohibited, based on a comparison of the judgment information stored on the wireless communication device that is stored in the information storage module and the judgment information stored on the portable recording medium input by the judgment information input module; and
   an output control module configured to control the output of the setting information to the interface based on the comparison of the judgment information stored on the wireless communication device and the judgment information stored on the portable recording medium;
   wherein the wireless communication device comprises a central processing unit, the central processing unit performing the operations of at least one of the setting information storage module, the interface, the judgment information input module, the determination module, and the output control module;
   wherein the judgment information stored on the wireless communication device and the judgment information stored on the portable recording medium include passwords respectively, and
   the determination module configured to provide permission to output the setting information to the interface when the passwords are identical;
   wherein the determination module configured to, in the case of failed input of the judgment information stored on the portable recording medium, obtain a change of the setting information from factory default setting information and provide permission to output the changed setting information to the interface.

2. The wireless communication device in accordance with claim 1, wherein the determination module determines whether the output of the setting information to the interface is to be permitted or prohibited, based on the judgment information stored on the portable recording medium and the setting information.

3. The wireless communication device in accordance with claim 1, the wireless communication device configured to confirm to International Standard IEEE 802.11, wherein the password is a Wired Equivalent Privacy key.

4. A control method of controlling a wireless communication device for encrypted communication, the wireless communication device having an interface that is used to write data into a portable recording medium, the control method comprising:
   storing setting information determined and to be used for the encrypted communication; and predetermined judgment information stored on the wireless communication device being at least part of setting information previously used for the encrypted communication;
   inputting judgment information stored on the portable recording medium from the portable recording medium, the judgment information stored on the portable recording medium being used to determine whether output of the setting information to the interface is to be permitted or prohibited;
   determining whether the output of the setting information to the interface is to be permitted or prohibited, based on a comparison of the judgment information stored on the wireless communication device and the judgment information stored on the portable recording medium; and
   controlling the output of the setting information to the interface based on the comparison of the judgment information stored on the wireless communication device and the judgment information stored on the portable recording medium;

wherein the judgment information stored on the wireless communication device and the judgment information stored on the portable recording medium include passwords respectively, providing permission to output the setting information to the interface when the passwords are identical; and in the case of failed input of the judgment information stored on the portable recording medium, obtaining a change of the setting information from factory default setting information and providing permission to output the changed setting information to the interface.

5. A non-transitory recording medium storing instructions for enabling a computer executing the instructions perform a method for controlling a wireless communication device for encrypted communication, which has an interface that is used to write data into a portable recording medium, the method comprising:

storing setting information determined and to be used for the encrypted communication and predetermined judgment information stored on the wireless communication device, the judgment information stored on the wireless communication device being at least part of setting information previously used for the encrypted communication;

inputting judgment information stored on the portable recording medium from the portable recording medium, the judgment information stored on the portable recording medium being used to determine whether output of the setting information to the interface is to be permitted or prohibited;

determining whether the output of the setting information to the interface is to be permitted or prohibited, based on a comparison of the judgment information stored on the wireless communication device and the judgment information stored on the portable recording medium; and controlling the output of the setting information to the interface based on the comparison of the judgment information stored on the wireless communication device and the judgment information stored on the portable recording medium;

wherein the judgment information stored on the wireless communication device and the judgment information stored on the portable recording medium include passwords respectively, providing permission to output the setting information to the interface when the passwords are identical; and in the case of failed input of the judgment information stored on the portable recording medium, obtaining a change of the setting information from factory default setting information and providing permission to output the changed setting information to the interface.

6. The wireless communication device in accordance with claim 1, wherein a password stored in the portable recording medium is used as the judgment information stored on the portable recording medium.

7. The wireless communication device in accordance with claim 1, further comprising an encrypted communication module configured to implement encrypted communication and configured to use the setting information stored in said setting information storage module for the encrypted communication.

8. The control method in accordance with claim 4, wherein a password stored in the portable recording medium is used as the judgment information stored on the portable recording medium.

9. The control method in accordance with claim 4, wherein the wireless communication device comprises a setting information storage module, the wireless communication device configured to store the setting information in the setting information storage module and configured to use the setting information stored in said setting information storage module for encrypted communication.

10. The non-transitory recording medium in accordance with claim 5, wherein a password stored in the portable recording medium is used as the judgment information stored on the portable recording medium.

11. The non-transitory recording medium in accordance with claim 5, the wireless communication device comprises a setting information storage module, the wireless communication device configured to store said setting information in the setting information storage module and configured to use the setting information stored in said setting information storage module for encrypted communication.

12. The wireless communication device in accordance with claim 1, wherein the portable recording medium is connectable to another wireless communication device.

* * * * *